March 12, 1957  C. GOODMAN  2,785,315
NUCLEAR WELL LOGGING
Filed March 11, 1952  2 Sheets-Sheet 1

INVENTOR.
CLARK GOODMAN
BY Campbell, Brumbaugh, Free & Graves
HIS ATTORNEYS

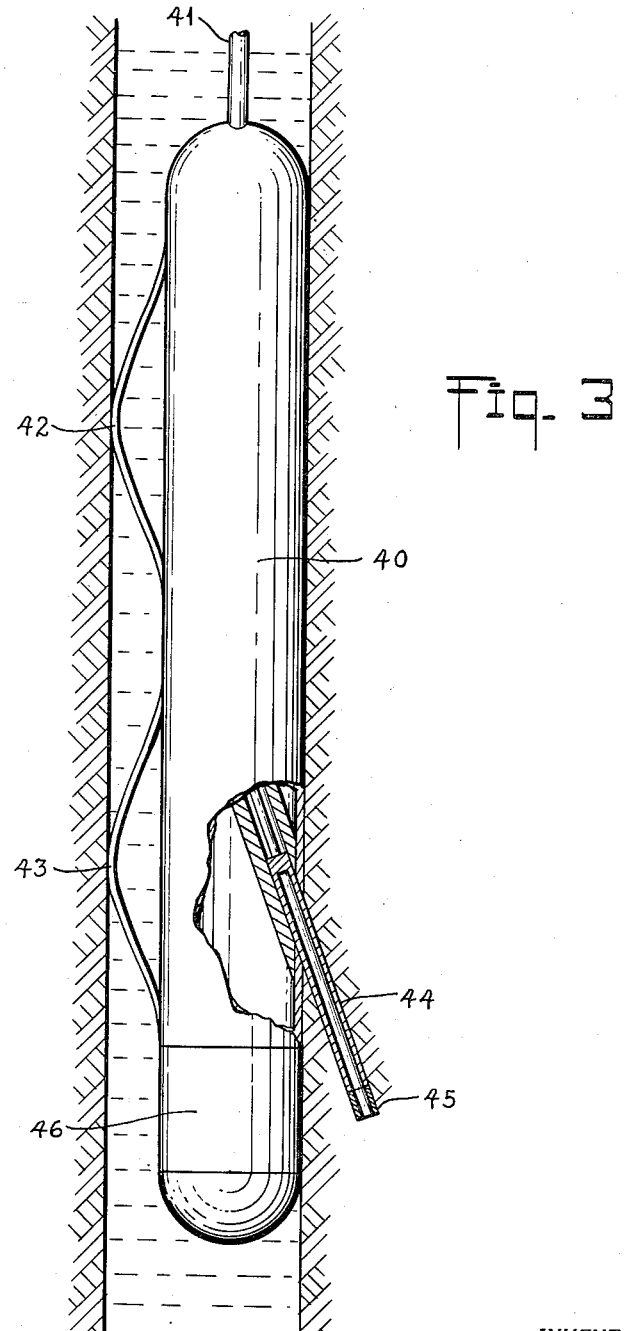

United States Patent Office 2,785,315
Patented Mar. 12, 1957

2,785,315

NUCLEAR WELL LOGGING

Clark Goodman, Boston, Mass., assignor to Schlumberger Well Surveying Corporation, Houston, Tex., a corporation of Texas Application March 11, 1952, Serial No. 275,931

6 Claims. (Cl. 250—83.6)

The present invention relates to nuclear well logging and, more particularly, to methods and apparatus employing nuclear reactions for obtaining indications of the porosity and composition of subsurface formations traversed by a borehole.

The nuclear reaction produced by the direct interaction of a high-energy photon, that is, a quantum of gamma or X radiation, and a nucleus is called "photodisintegration." Photon-induced reactions are characterized by a sharply defined threshold energy and usually by the emission of a neutron from the nucleus. If the bombarding photon has an energy less than the threshold value no neutron is emitted, and the absorbed energy merely increases the kinetic energy of the nucleons in the nucleus.

It is well known that the nuclei of the various substances, i. e., the elements and their isotopes, differ in their relative susceptibilities to photodisintegration. The substance having the lowest known threshold energy for photodisintegration is beryllium, which emits neutrons when bombarded by gamma rays of 1.66 million electron volts (m. e. v.) or greater. The next most readily photodisintegrated substance is deuterium at 2.23 million electron volts, while other known substances have threshold energies greater than 4 million electron volts. Thus, when beryllium is bombarded with gamma rays or X-rays having energies of 1.66 m. e. v. or higher, or when deuterium is bombarded with gamma rays or X-rays having energies of 2.23 m. e. v. or higher, photo-neutrons are emitted.

Accordingly, it has been proposed heretofore to log the formations traversed by a borehole by irradiating the formations with gamma rays from a photon source placed in the hole and simultaneously obtaining an indication of the neutrons resulting from photodisintegration, in an effort to correlate the formations traversed by one well with the same formations traversed by a nearby well, or to identify the substances comprising formations by their various threshold energies.

However, such methods have not proved practical. Beryllium is very rare in borehole formations; consequently the presence or absence of beryllium is of little significance in correlating the formations traversed by a borehole or in locating oil and gas. Therefore, emitting gamma rays of relatively low energy, i. e., below 2.23 m. e. v., from a source in the borehole and detecting the neutrons in the borehole at the same level does not provide information useful either for correlation or for composition analysis. If higher energy sources were used in the borehole, as has been proposed, the gamma radiation would cause neutrons to be emitted by the deuterium in the borehole liquid, since the hydrogen in all hydrogenous materials normally contains approximately 0.02 percent deuterium. The presence of any neutrons returning from the formation would, therefore, be effectively masked by the neutrons emitted by the drilling liquid.

Accordingly, it is an object of the invention to provide novel methods and apparatus for nuclear borehole logging wherein the masking effect of the drilling liquid is overcome.

Another object of the invention is to provide novel methods and apparatus utilizing the phenomenon of photodisintegration for obtaining indications of the porosity and composition of the formations traversed by a borehole.

These objects of the invention are attained by inserting into a formation a source of photon radiation, such as gamma rays or X-rays, having energies greater than the threshold energy of the substance desired to be detected but less than the threshold energy of the next most readily photodisintegrated substance. For example, if a source of gamma rays having energies greater than 2.23 m. e. v. is inserted into a porous formation containing a hydrogenous material, such as oil or water, photo-neutrons will be emitted by the deuterium in the material. The neutron flux is a direct function of the amount of hydrogenous material present which in turn is a function of the porosity. The intensity of the neutron flux may be readily indicated by means of a suitable neutron detector in the borehole and an associated recorder at the surface of the earth. By inserting the source to a sufficient depth in the formations the effect of the water in the borehole is practically eliminated, since the gamma rays from the source lose substantially all their energy and intensity in the formations and fall below the threshold energy for photodisintegration before reaching the wall of the borehole.

The invention will be more fully understood from the following detailed description of several representative embodiments taken in conjunction with the accompanying drawings in which:

Fig. 3 is a second embodiment of the invention whereby measurements may be made successively at a number of locations in the borehole with a single radioactive source.

Figure 1:
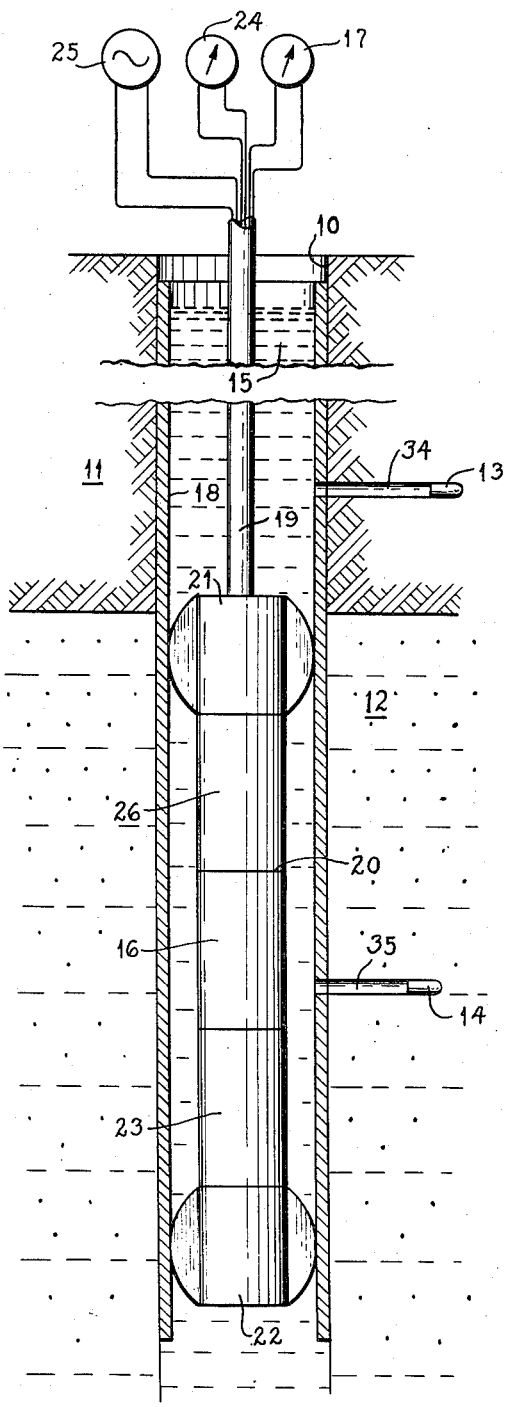
Fig. 1 is a schematic representation of a neutron detector suspended in a borehole for detecting neutrons resulting from the photodisintegration of substances by gamma rays emitted from radioactive projectiles inserted into formations traversed by a borehole.

In Fig. 1, a borehole 10 traverses an impermeable earth formation 11 and a permeable formation 12, which latter formation contains hydrogenous material in its pore spaces. Sources 13 and 14 of high energy photons have been inserted a substantial distance from the borehole 10 transversely into the formations 11 and 12, respectively. Photon sources 13 and 14 emit gamma rays or X-rays having quanta energies greater than 2.23 m. e. v., the threshold energy for the deuterium contained in hydrogenous materials in the formation 12, but less than 4 m. e. v., the approximate threshold energy of disintegration for the next higher substance. As a practical matter, there are several portable radioactive sources available in the energy range from 2.23 m. e. v. to 4 m. e. v.

The sources 13 and 14 are inserted in the formations 11 and 12, respectively, a sufficient distance from the wall of the borehole 10 such that substantially any primary gamma radiation that reaches the borehole liquid 15 from the sources is so reduced in energy and intensity that it produces a negligible flux of neutrons in the borehole liquid. Essentially all of the secondary or scattered gamma rays are below 2.23 m. e. v. in energy. Therefore, in the absence of beryllium, which is normally the case, substantially the only neutrons present in the borehole opposite the formation 14 result from the photodisintegration of deuterium in hydrogenous material in the formation 14.

By lowering a suitable neutron detector 16 in the borehole 10 opposite the sources 13 and 14 and noting the response on its indicator 17, these photo-neutrons may be detected and the operator apprised of the fact that the formation 11 is impermeable and the formation 12 is porous. If the quantum energy in millions of electron volts and the strength in curies of the sources are known as well as the distances between the sources and the detector 16, the indications of the indicator 17 will give the relative porosity of the formations 11 and 12.

In one form of the invention the photon sources 13 and 14 may be placed in projectiles and shot into the desired formations, as disclosed, for example, in U. S. Patent No. 2,476,137 issued July 12, 1949, to H. G. Doll for "Method of Positioning Apparatus in Boreholes." At the time of placing the sources 13 and 14 in the formations 11 and 12, respectively, the boreholes 10 may be cased with a casing 18 as shown, or uncased. Also the borehole need not be cased while making the subsequent neutron detection. The projectiles may contain, for example, 0.1 to 10 curies of radioactive sodium (Na 24), which radiates 2.76 m. e. v. gamma rays with a 14.8 hour half life, though any other suitable radioactive element or isotope may be employed.

After the photon sources 13 and 14 have been inserted into the desired formations, the perforating apparatus may be removed from the borehole 10, and detecting equipment 20 lowered therethrough by means of an electrical cable 19 in a manner well known in the art. The detecting equipment 20 is preferably centered in the borehole 10 by means of any conventional centering device, such as guides 21 and 22, for example. The equipment 20 preferably contains apparatus 23 for determining the transverse depths of the sources 13 and 14 in the formations 11 and 12, respectively. However, if the depths of the sources in the formations are already known, as by calculations based on the amount of the explosive charge and the hardness of the formations, the apparatus 23 need not be employed. Furthermore, if merely indications of relative porosity are desired, the determination of the depths of the sources 13 and 14 is unnecessary.

If the borehole 10 is uncased, the depth detector 23 may comprise, for example, a suitable induction coil system for determining by mutual inductance effects the depth of conductive materials, such as the steel in the bullets containing the sources 13 and 14, in the nonmetallic material of the formations 11 and 12. An indicator 24 is preferably provided at the surface of the earth to make a record of the response of the detector 23 as a function of its depth in the borehole 10, whereby the transverse penetration of the sources 13 and 14 will be accurately known. Alternatively, whether the borehole is cased or uncased, the detector 23 may comprise a suitable gamma ray detector since the number of gamma rays reaching the detector 23 from the sources 13 and 14 is a direct function of the distances of the sources within the formations.

An electrical power source 25 is located at the earth's surface and energizes electronic circuits 26 in the subsurface equipment 20 which are adapted to supply the necessary voltages to operate the neutron detector 16 and the source depth detector 23.

It is to be understood that if the neutron detector 16 is of the proportional counter type, it may be made to operate as a gamma ray detector by merely increasing the voltage applied thereto until it operates in the Geiger range. Thus with the lower voltage applied to the detector 16 it will give indications of the neutrons present in the borehole 10 and with the higher voltage it will give indications of the depths of the sources 13 and 14 in the formations.

Figure 2:
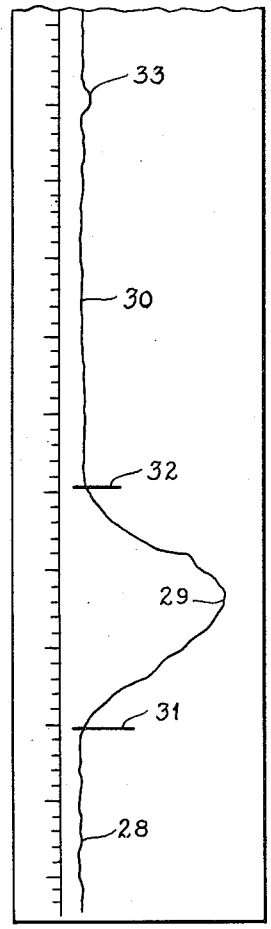
Fig. 2 is a graph illustrating the indications that may be obtained with the apparatus shown in Fig. 1.

A typical neutron log 27 is shown in Fig. 2 made by the meter 17 as the equipment 20 of Fig. 1 is passed through the borehole 10. Thus, as the neutron detector 16 is raised through the borehole 10 opposite the formations below the source 14, substantially no neutrons will be detected, as is shown by portion 28 of the log 27. However, as the detector 16 nears the location of the source 14, the neutron flux increases to a maximum value 29 opposite the source 14, and then decreases as the detector 16 is raised to the section of the borehole 10 between the sources 14 and 13, as is shown by portion 30 of the log 27. The large increase in neutron flux opposite the source 14 is caused by the photodisintegration of deuterium in the hydrogenous material in the porous formation 12 under the bombardment of the high energy gamma rays from the source 14. The area under the portion 29 of the log 27 between points 31 and 32 of increased neutron flux is proportional to the concentration of hydrogen nuclei and, hence, proportional to the porosity of the formation 12.

When the neutron detector 16 passes source 13, embedded in the impervious formation 11, a slightly increased value 33 in the neutron flux will be recorded on the log 27. This is a result of the photodisintegration of the deuterium in drilling liquid 34 in the opening made when the source 13 was inserted in the formation 11. This small neutron flux may be disregarded, and the operator at the surface recognizes that the formation 11 is impervious. However, for quantitive measurements the neutron flux indicated by value 33 of the log 27 may be subtracted from the flux value 29 in order to eliminate from the calculations the neutron flux caused by the presence of drilling liquid 35 in the opening left by the insertion of the source 14.

Many other ways of inserting radioactive sources into formations traversed by a borehole will occur to those skilled in the art. For example, the radioactive source may be placed on the end of a core barrel used for obtaining side wall samples of formations traversed by a borehole as shown, for example, in U. S. Patent No. 2,558,452, entitled "Side Wall Sample Taker" and granted June 26, 1951, to Maurice Mennecier, or in copending application Serial No. 773,146, filed September 10, 1947, by said Maurice Mennecier for "Side Wall Sample Taking Apparatus," now Patent No. 2,599,405.

In Fig. 3, a housing 40 is shown suspended by a cable 41 and is constructed substantially in accordance with the disclosure in the aforementioned patent. When the housing 40 is opposite a formation concerning which information is desired and is pressed thereagainst, as for example, by means of spring 42 and 43, a rotary core barrel 44 is inserted into the formation to a considerable depth. In accordance with the present invention, however, the tip of the core barrel 44 contains a highly radioactive source 45. The housing 40 at its lowermost portion encloses a suitable neutron detector 46 connected to a meter (not shown) at the surface of the earth in substantially the same manner as the neutron detector 16 shown in Fig. 1. When the core barrel 44 is extended fully into the formation, the distance between the radioactive source 45 and the detector 46 is known. The neutron flux detected by the neutron detector 46 will be indicative of the porosity of the formation between the source 45 and the detector 46, in accordance with the principles outlined above.

This construction has several advantages. It permits the highly radioactive source 45 to be used more than once, and since some of these radioactive isotopes are quite expensive, this will represent a substantial economy. Furthermore, if the operator desires to obtain cores and to determine the porosity of the formation simultaneously, the neutron detector 46 will indicate whether the formation is of interest before the core barrel 44 is inserted to any substantial depth in the formation. This procedure saves the time and expense of fully sampling a formation of no interest. Also, the use of a sample taker as shown in the aforementioned copending application permits many locations to be tested for porosity during a single run in the borehole.

The gamma ray or X-ray substances used in the sources shown in Fig. 1 preferably have a short half life, i. e., from several hours to a few days, in order that after a short time further radioactivity logs will not be distorted by the residual artificial radioactivity of the sources. In contrast the source 45, shown in Fig. 3, may have a relatively long half life, since this source does not remain in the formation and may be used repeatedly.

Still other methods of injecting the radioactive material into the formation will suggest themselves to those skilled in the art. For example, the side wall sample taking device shown in U. S. Patent No. 2,020,856 issued November 12, 1935, to Conrad Schlumberger may have radioactive material incorporated in its projectiles, and a suitable neutron detector may be enclosed in the projectile housing. The threshold energies for photodisintegration of substances next in order after beryllium and deuterium are oxygen —17 at 4.12 m. e. v., carbon —13 at 4.88 m. e. v. and lithium —6 at 5.2 m. e. v. Accordingly, the presence of oil in a formation may be determined by first logging the borehole with a photon source having an energy of at least 2.23 m. e. v. and less than 4.12 m. e. v. and then logging with a photon source having an energy of at least 4.88 m. e. v. and less than 5.2 m. e. v. The presence of hydrogen is revealed by the first log and the presence of carbon is ascertained from the second log. It will be obvious, therefore, that the present invention should not be limited by the specific embodiments disclosed herewith but only by the appended claims.

I claim:

1. A method of logging a borehole comprising inserting into a formation through the wall of the borehole a source of photons having quanta energizes in excess of about 2.23 million electron volts and less than the threshold energy of the next most readily photodisintegrated substance, the source being inserted into the formation a distance sufficient to reduce the energy of photons reaching the borehole to below the threshold energy of photodisintegration of deuterium, and detecting neutrons in the borehole as an indication of hydrogenous material in the formation.

2. A method of logging a borehole traversing earth formations comprising inserting a source of gamma rays having quanta energies in excess of about 2.23 million electron volts and less than the threshold energy of the next most readily photodisintegrated substance, into an earth formation a distance sufficient to reduce the energy of gamma rays reaching the borehole to below the threshold energy of photodisintegration of deuterium, measuring the depth of penetration of the source from the wall of the borehole, and measuring the intensity of the neutron flux in the borehole as a result of photodisintegration of hydrogenous material in the formation.

3. A method of logging a borehole traversing earth formations comprising placing a source of gamma rays having quanta energies in excess of about 2.23 million electron volts and less than the threshold energy of the next most readily photodisintegrated substance, transversely into an earth formation a distance sufficient to reduce the energy of gamma rays reaching the borehole to below the threshold energy of photodisintegration of deuterium, and measuring the intensity of the neutron flux in the borehole as an indication of hydrogenous material in the formation.

4. Apparatus for logging a borehole traversing earth formations comprising means for inserting into a formation of source of photons a distance sufficient to reduce the energy of photons reaching the borehole to below the threshold energy of photodisintegration of deuterium, the source of photons having quanta energies in excess of about 2.23 million electron volts and less than the next most readily photodisintegrated substance, means for detecting neutrons in the borehole, and means for indicating the intensity of the neutron flux as a function of depth in the borehole.

5. Apparatus for logging a borehole traversing earth formations comprising a coring device having a core barrel insertable a predetermined distance into a formation, a source of gamma rays having quanta energies in excess of about 2.23 million electron volts and less than the threshold energy of the next most readily photodisintegrated substance, said source being associated with the end of said core barrel, said predetermined distance being a distance sufficient to reduce the energy of gamma rays reaching the borehole to below the threshold energy of photodisintegration of deuterium, a neutron detector adjacent said core device for detecting neutrons in the borehole, and an indicator for indicating the intensity of the neutron flux as a measure of hydrogenous material in the formation.

6. Apparatus for logging a borehole traversing earth formations comprising means for projecting a bullet into a formation, said bullet including a source of gamma rays having quanta energies in excess of about 2.23 million electron volts and less than the threshold energy of the next most readily photodisintegrated substance, said bullet being projected a sufficient distance into the formation to reduce the energy of gamma rays reaching the borehole to below the threshold energy of photodisintegration of deuterium, means for measuring the depth of penetration of the bullet, and means for detecting neutrons in the borehole as an indication of hydrogenous material in the formation.

References Cited in the file of this patent

UNITED STATES PATENTS

| | | |
|---|---|---|
| 2,206,634 | Fermi et al. | July 2, 1940 |
| 2,320,643 | Neufeld | June 1, 1943 |
| 2,335,409 | Hare | Nov. 30, 1943 |
| 2,390,931 | Fearon | Dec. 11, 1945 |
| 2,558,227 | Yancey et al. | June 26, 1951 |
| 2,558,452 | Mennecier | June 26, 1951 |
| 2,581,412 | Herzog | Jan. 8, 1952 |